UNITED STATES PATENT OFFICE.

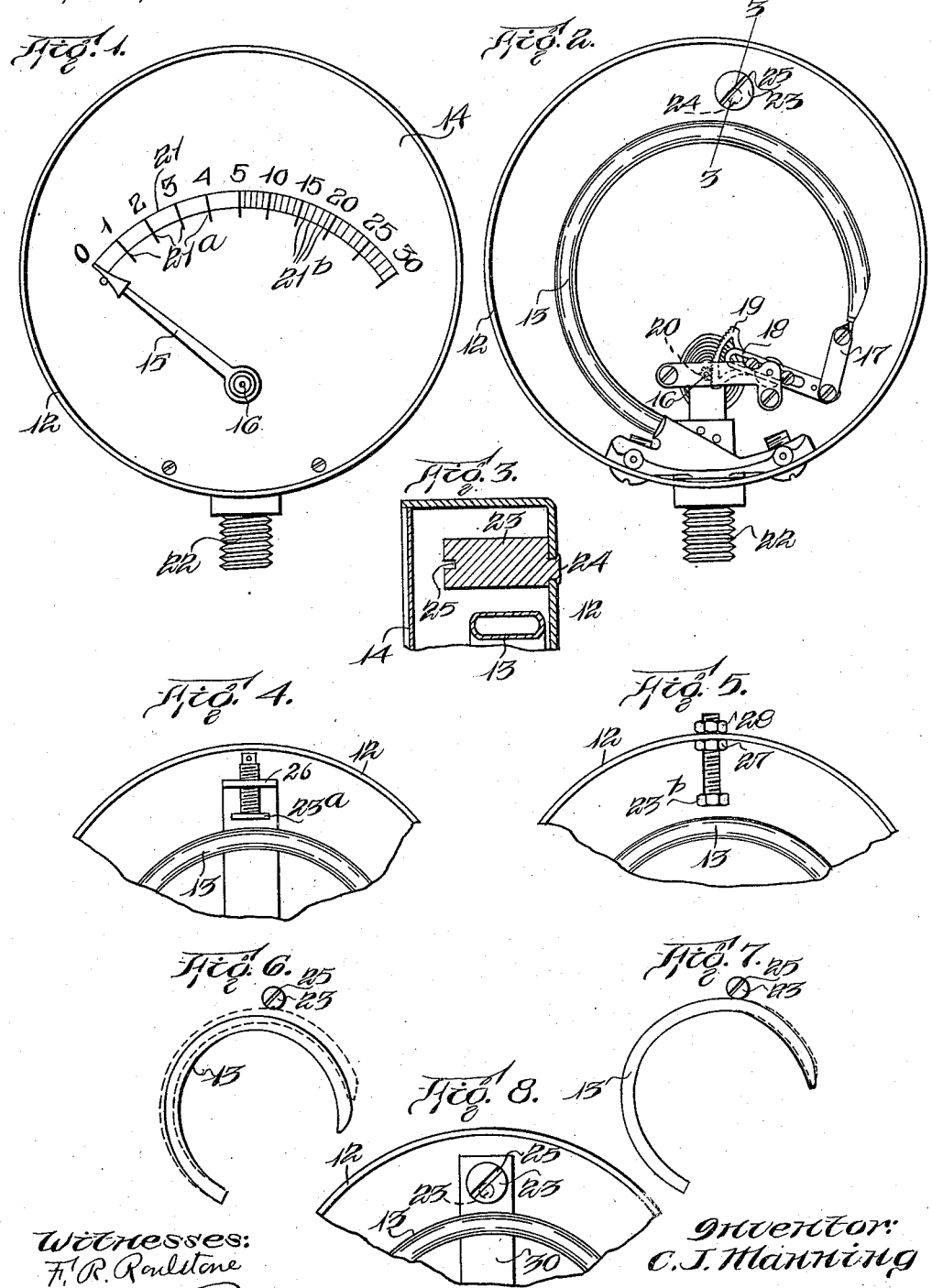

COLEMAN J. MANNING, OF MEDFORD, MASSACHUSETTS, ASSIGNOR TO AMERICAN STEAM GAUGE AND VALVE MANUFACTURING COMPANY, OF BOSTON, MASSACHUSETTS, A CORPORATION OF MASSACHUSETTS.

PRESSURE-GAGE.

1,169,982.

Specification of Letters Patent.

Patented Feb. 1, 1916.

Application filed October 2, 1914. Serial No. 864,612.

*To all whom it may concern:*

Be it known that I, COLEMAN J. MANNING, a citizen of the United States, and resident of Medford, in the county of Middlesex and State of Massachusetts, have invented certain new and useful Improvements in Pressure-Gages, of which the following is a specification.

This invention relates to a pressure gage comprising a Bourdon spring connected by suitable mechanism with a pointer and adapted to be flexed from its normal form by fluid pressure to move the pointer forward over a dial, the pointer being moved backward by the spring when the latter returns to its normal form.

The invention has for its object to enable the spring and pointer to have movements of maximum amplitude when the fluid pressure is relatively low, and movements of lesser or minimum amplitude when the fluid pressure is relatively high, to the end that relatively low pressures, which are those more frequently exerted and registered, may be easily read by the aid of widely spaced graduations on a segmental dial scale, while higher pressures, which are less frequently exerted and registered, may be read by the aid of more narrowly spaced graduations on the same dial scale, the length of the scale required for registering all pressures exerted being reduced to the minimum.

The invention consists in the improvements which I will now proceed to describe and claim.

Of the accompanying drawings forming a part of this specification: Figure 1 represents a front view of a pressure gage embodying my invention, the dial being in place; Fig. 2 represents a view similar to Fig. 1, the dial being removed; Fig. 3 represents a section on line 3—3 of Fig. 2, showing a portion of the dial; Figs. 4 and 5 represent fragmentary views showing modifications of the Bourdon spring abutment hereinafter referred to; Figs. 6 and 7 are diagrammatic views of the spring and abutment; Fig. 8 represents a view similar to Figs. 4 and 5, showing another modification.

The same reference characters indicate the same or similar parts in all the views.

In the drawings: 12 represents the case, 13 the Bourdon spring, 14 the dial, and 15 the pointer of a pressure gage, which, excepting as hereinafter specified, is of common and well known construction, the pointer being mounted on an arbor 16 which is connected with the free end of the Bourdon spring by mechanism including a link 17, a lever 18 having a segmental rack 19, and a pinion 20 on the arbor meshing with the rack. When the Bourdon spring is at rest the pointer is held at the zero mark on a segmental scale 21 on the dial, and when the spring is flexed outwardly by fluid pressure admitted through the nipple 22 the pointer is moved forward over the scale.

In carrying out my invention I provide an abutment located in the path of movement which is imparted to the spring 13 by its outward flexure, said abutment being separated from the spring when the latter is at rest or in its normal form and position. As shown by Figs. 2 and 3, said abutment is a cylindrical stud 23 having an eccentric neck 24 fitted closely to turn in an orifice in the back of the case, so that a partial rotation of the stud will vary the distance between its periphery and the spring when the latter is at rest, the abutment being rotatable by a screw-driver engaged with a slot 25 in its outer end, and retained by friction at any position to which it may be rotated.

The abutment 23 is so arranged that the spring 13 is free to be flexed normally or throughout its entire length to a limited extent before it contacts with the abutment. During this normal outward flexure, and any return movement caused by the inward flexure of the spring when the pressure decreases the spring moves the pointer 15 over the portion of the scale 21 having widely spaced graduations 21$^a$ (Fig. 1), pressure registration being therefore easily read.

When the outward flexure of the spring brings it into contact with the abutment, the effective length of the spring is reduced so that subsequent outward flexure is limited to the portion of the spring between its free end and the abutment. During this limited flexure and any return movement caused by inward flexure, the spring moves the pointer over the portion of the dial scale having the narrowly spaced graduations 21$^b$, the amplitude of the movements of the pointer caused by given variations of pressure being greatly reduced, so that a relatively short and compact scale is adapted to coöperate with the pointer in registering wide variations of pressure, the variations registered by the coöperation of the pointer with the closely spaced graduations being those which are infrequently exerted, so that although the registration is less easily read this objection is negligible.

The adjustability of the abutment 23 enables the extent of both the normal flexure and limited flexure of the spring 13 to be varied as circumstances may require. Figs. 4 and 5 show other forms of adjustable abutment, Fig. 4 showing an abutment 23ª which is a headed screw engaged with a tapped orifice in a fixed ear 26 in the case 12, while Fig. 5 shows an abutment 23ᵇ which is a headed screw engaged with a tapped orifice in the case 12 and provided with lock nuts 27, 28, bearing on the outer and inner sides of the case.

Fig. 6 shows by full and dotted lines the normal flexure of the spring 13, and Fig. 7 shows by full and dotted lines the limited flexure of the spring caused by contact of the spring with the abutment.

The eccentric neck 24 of the abutment 23 may be fitted closely to turn in an orifice in a fixed plate 30 within the case 12, as shown by Fig. 8.

Having described my invention, I claim:

1. In a pressure gage comprising a case, a pointer, a Bourdon spring, and connections between the free end of the spring and the pointer for operating the latter, an abutment secured to the case in the path of movement of the spring and arranged to permit a limited unobstructed outward movement of the spring from its initial position, and to thereafter arrest the outward movement of the inner portion of the spring, leaving only the outer portion free to operate the pointer.

2. A pressure gage comprising a case, a pointer, a member having one end fixed and the other end free to move under variations of pressure, the latter end being connected to the pointer to actuate it, a scale having its high-indicating graduations closer together than the low-indicating graduations, and means adjacent an intermediate portion of said member to limit the capability of movement of said member, under high pressure, to the portion beyond said limiting means.

In testimony whereof I have affixed my signature, in presence of two witnesses.

COLEMAN J. MANNING.

Witnesses:
 C. F. Brown,
 P. W. Pezzetti.

Copies of this patent may be obtained for five cents each, by addressing the "Commissioner of Patents, Washington, D. C."